United States Patent
Rao et al.

(10) Patent No.: US 10,330,773 B2
(45) Date of Patent: Jun. 25, 2019

(54) RADAR HARDWARE ACCELERATOR

(71) Applicant: Texas Instruments Incorporated, Dallas, TX (US)

(72) Inventors: Sandeep Rao, Karnataka (IN); Karthik Ramasubramanian, Karnataka (IN); Indu Prathapan, Karnataka (IN); Raghu Ganesan, Karnataka (IN); Pankaj Gupta, Rajasthan (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 284 days.

(21) Appl. No.: 15/184,715

(22) Filed: Jun. 16, 2016

(65) Prior Publication Data
US 2017/0363711 A1  Dec. 21, 2017

(51) Int. Cl.
| | |
|---|---|
| *G01S 7/02* | (2006.01) |
| *G01S 13/34* | (2006.01) |
| *H04B 15/02* | (2006.01) |
| *H04L 27/10* | (2006.01) |
| *G01S 7/35* | (2006.01) |

(52) U.S. Cl.
CPC .............. *G01S 7/023* (2013.01); *G01S 7/354* (2013.01); *G01S 13/34* (2013.01); *H04B 15/02* (2013.01); *H04L 27/103* (2013.01); *G01S 2007/356* (2013.01)

(58) Field of Classification Search
CPC .... G01S 7/023; G01S 7/354; G01S 2007/356; H04B 15/02; H04L 27/103; H04L 27/2665
USPC ........................................................... 342/93
See application file for complete search history.

(56) References Cited

U.S. PATENT DOCUMENTS

| | | | | |
|---|---|---|---|---|
| 4,488,154 A | * | 12/1984 | Ward .................. | G01S 13/5248 342/162 |
| 5,270,973 A | * | 12/1993 | Guillemaud ......... | G11C 7/1075 365/189.02 |

(Continued)

OTHER PUBLICATIONS

Automotive 24GHz radar development kit. Based on Infineon AURIX family and BGT24A MMIC family. Infineon Feb. 2016 [online]. Retrieved from the Internet: <URL:https://www.infineon.com/dgdl/Infineon-Automotive_24GHz_radar_development_kit-PB-v01_00-EN.pdf?field=5546d462525dbac401529c596b1806c3>.

*Primary Examiner* — Frank J McGue
(74) *Attorney, Agent, or Firm* — Ronald O. Neerings; Charles A. Brill; Frank D. Cimino

(57) ABSTRACT

A radar hardware accelerator (HWA) includes a fast Fourier transform (FFT) engine including a pre-processing block for providing interference mitigation and/or multiplying a radar data sample stream received from ADC buffers within a split accelerator local memory that also includes output buffers by a pre-programmed complex scalar or a specified sample from an internal look-up table (LUT) to generate pre-processed samples. A windowing plus FFT block (windowed FFT block) is for multiply the pre-processed samples by a window vector and then processing by an FFT block for performing a FFT to generate Fourier transformed samples. A post-processing block is for computing a magnitude of the Fourier transformed samples and performing a data compression operation for generating post-processed radar data. The pre-processing block, windowed FFT block and post-processing block are connected in one streaming series data path.

20 Claims, 2 Drawing Sheets

(56) References Cited

U.S. PATENT DOCUMENTS

| | | | | |
|---|---|---|---|---|
| 5,387,824 A | * | 2/1995 | Michelsen | G11C 7/1051 326/21 |
| 5,850,202 A | * | 12/1998 | Goodman | G01S 7/023 342/25 A |
| 2004/0170237 A1 | * | 9/2004 | Chadha | H04L 27/2663 375/343 |
| 2004/0172234 A1 | * | 9/2004 | Dapp | G06F 8/427 704/1 |
| 2008/0019464 A1 | | 1/2008 | Kloper et al. | |
| 2009/0002227 A1 | * | 1/2009 | Jia | G01S 19/37 342/357.27 |
| 2012/0280854 A1 | * | 11/2012 | Corbett | G01S 7/023 342/159 |
| 2014/0062753 A1 | * | 3/2014 | Grooters | G01S 13/9303 342/21 |
| 2016/0013743 A1 | | 1/2016 | Braat et al. | |

* cited by examiner

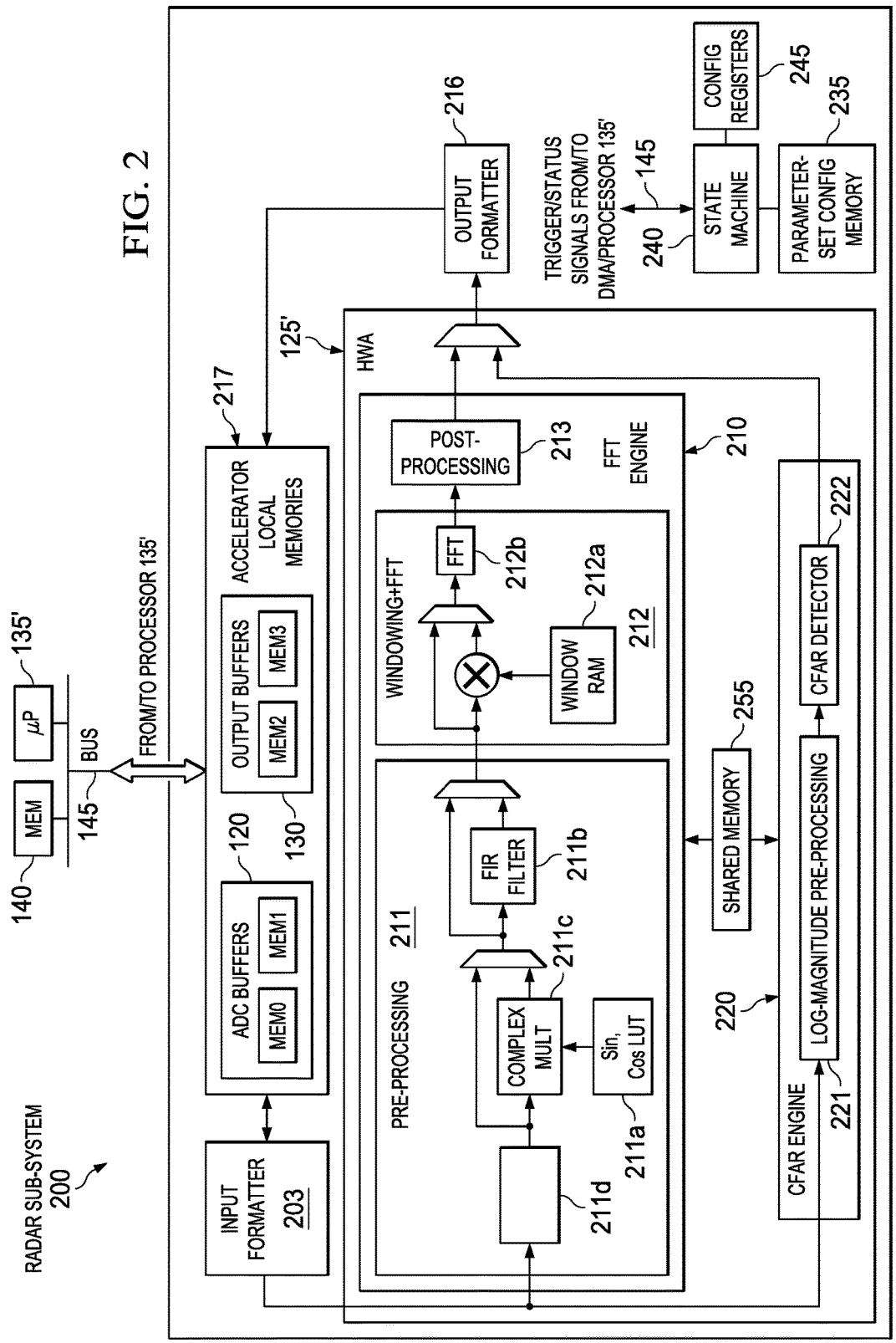

RADAR HARDWARE ACCELERATOR

FIELD

Disclosed embodiments relate to hardware accelerators for radar systems.

BACKGROUND

Radar is used in many applications to detect target objects such as airplanes, military targets, vehicles, and pedestrians. Radar finds use in a number of applications associated with a motor vehicle such as for adaptive cruise control, collision warning, blind spot warning, lane change assist, parking assist and rear collision warning. Pulse radar or Frequency-Modulated Continuous-Wave (FMCW) radar are conventionally used in such applications.

In a radar system, a local oscillator (LO) generates a transmit signal. A voltage controlled oscillator (VCO) converts a voltage variation into a corresponding frequency variation. The transmit signal is amplified and transmitted by one or more transmit units. In FMCW radar, the frequency of the transmit signal is varied linearly with time. This transmit signal is referred as a ramp signal or a chirp signal. One or more obstacles scatters (or reflects) the transmit signal which is received by one or more receive units in the FMCW radar system.

A baseband signal is obtained from a mixer which mixes the transmitted LO signal and the received scattered signal that is termed an intermediate frequency (IF) signal. The IF signal is signal conditioned by a conditioning circuit which includes an amplifier and an anti-alias filter, is sampled by an analog to digital converter (ADC), and then is processed by a processor (e.g., microprocessor) to estimate a distance and a velocity of one or more nearby obstacles that provide scatter. Each peak in the fast Fourier transform (FFT) of the digitized IF signal corresponds to an object. The frequency of the IF signal is proportional to the range (distance) of the obstacle(s).

77 GHz automotive radar is a fast-growing market segment, with a variety of existing and emerging applications. For example, the frequency of the transmitted chirp signal may be controlled to increase at a constant linear ramp rate from 77 GHz to 81 GHz in a period of about 100 microseconds. FMCW modulation is the preferred radar choice due to its various advantages including a large RF sweep bandwidth (enabling high range resolution), while keeping the IF/ADC bandwidth small, and lower peak power consumption needed as compared to pulsed radar.

The signal processing for FMCW radar systems (such as for advanced driver assist systems (ADAS)) is typically performed using a radar micro controller unit (MCU). The radar MCU generally includes a FFT hardware accelerator and a lock-step safety central processing unit (CPU) for object detection and tracking.

FMCW radar signal processing involves generating what is termed three (3) dimensions including the computation of a first-dimension (range) FFT, second-dimension (Doppler) FFT and third-dimension angle-of-arrival estimation processing (beamforming). An advantage of using a fast (sawtooth) FMCW radar waveform is that it can provide a two-dimensional range-velocity view of the objects illuminated by the radar, and additionally, the angle-of-arrival can be obtained through the use of multiple TX/RX antennas using digital beamforming.

SUMMARY

This Summary briefly indicates the nature and substance of this Disclosure. It is submitted with the understanding that it will not be used to interpret or limit the scope or meaning of the claims.

Disclosed embodiments recognize known hardware accelerator (HWA) architectures for FMCW radar signal processing have several problems. Such problems include latency, lack of flexibility in sequencing data into and out of the HWA, and the radar signal processing that that is performed by the HWA is dependent on processor intervention.

Disclosed HWAs solve these problems with known HWA architecture for FMCW radar signal processing having several unique features which enables high-performance and flexibility for the customer, with support for off-loading of some frequently used radar signal processing computations from the processor to the HWA. Disclosed HWAs include a fast Fourier transform (FFT) engine including a pre-processing block for providing at least one of interference mitigation, finite impulse response (FIR) filtering, and multiplying a radar data sample stream received from ADC buffers within a split accelerator local memory that also includes output buffers by a pre-programmed complex scalar or a specified sample from an internal look-up table (LUT) to generate pre-processed samples, a windowing plus FFT block (windowed FFT block) for multiplying the pre-processed samples by a window vector and then processing by a FFT block for performing a FFT to generate Fourier transformed samples, and a post-processing block for computing a magnitude of the Fourier transformed samples and performing a data compression operation for generating post-processed radar data. The processing block, windowed FFT block, and post-processing block are connected in one streaming series data path which reduces latency.

BRIEF DESCRIPTION OF THE DRAWINGS

Reference will now be made to the accompanying drawings, which are not necessarily drawn to scale, wherein:

FIG. 2 shows a radar sub-system that includes an example HWA shown in one example HWA implementation interfaced by a bus to a processor shown as a microprocessor, according to an example embodiment.

DETAILED DESCRIPTION

Figure 1:
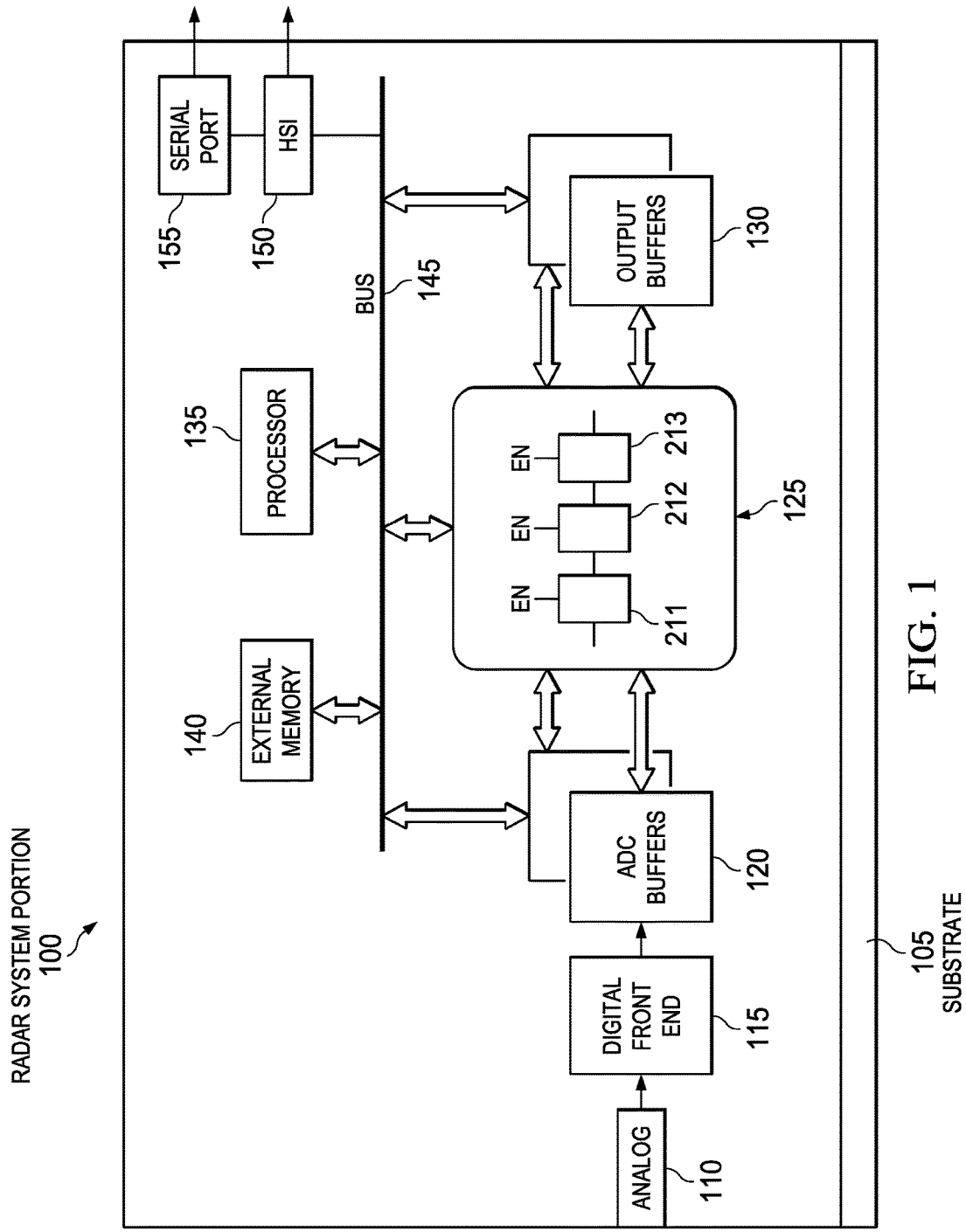
FIG. 1 is a block diagram representation of radar system portion that includes a disclosed HWA for radar signal processing, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 is a block diagram representation of an example radar system portion 100 that includes a disclosed HWA 125 providing a FFT Engine for radar signal processing including performing a plurality of FFT calculation or computations. FIG. 2 shows an example radar sub-system 200 that includes an example HWA 125' shown in one example HWA implementation interfaced by a bus 145 to a processor shown as a microprocessor (µP) 135'.

These FFT computations comprise obtaining the above-described three (3) dimensions including the computation of a first-dimension (range) FFT, second-dimension (Doppler) FFT, and third-dimension angle-of-arrival estimation processing (beamforming). HWA 125 is shown in FIG. 1 and HWA 125' in FIG. 2 having a core computation unit including a pre-processing block 211, windowed FFT block 212 and a post-processing block 213 connected together in one streaming series data path. HWA 125 enables a compact (i.e., low area,) implementation for frequently used signal processing computations in an FMCW radar receiver.

Each of the pre-processing block 211, windowed FFT block 212 and post-processing block 213 include an independent enable (EN) circuit shown in FIG. 1 to provide independent muxing controls that enable/bypass (disable) for any combination of the pre-processing block 211, windowed FFT block 212 and post-processing block 213. This provides greater flexibility while chaining multiple accelerator operations that enable a customer to use the HWA 125 to implement a variety of processing steps. The complete configuration for each of the blocks (pre-processing block 211, windowed FFT block 212, post-processing block 213, as well as the optional Constant False Alarm Rate (CFAR) engine 220 and CFAR detector 222 in FIG. 2 described below) including the enable/disable is programmed into the parameter-set configuration-set configuration memory 235 shown in FIG. 2 by the µp 135 and the state machine 240 shown in FIG. 2 then configures each block as per the programmed contents of parameter-set configuration memory 235.

The signal processing steps radar system portion 100 performs obtaining the three-dimensional image of objects involves computing a first-dimension (range) FFT on the data samples from ADC buffers 120 corresponding to each transmitted chirp using the windowed FFT block 212. This is followed by a second-dimension (Doppler) FFT, which is performed across chirps, where the range-FFT samples are fed in to the windowed FFT block 212 in transpose order compared to the first-dimension FFT. The angle-of-arrival estimation also involves FFT computations by windowed FFT block 212 with yet another transpose at the input. The HWA 125 also has a post-processing block 213 for optionally computing a magnitude or log-magnitude of the radar image obtained from the FFT operations provided by the windowed FFT block 212. Further and optionally, the sum of the magnitude or log-magnitude of the radar image across a plurality of antennas can be obtained by passing the corresponding samples across antennas obtained at the output of the post-processing block 213 through the FFT engine 210 and retaining only the first sample of the FFT engine output. This exploits the fact that the first output of an FFT computation represents the sum of the samples. Thus for computing the sum across 4 antennas, a 4-point FFT would be computed for every 4 corresponding samples across antennas. Disclosed post-processing is useful in preparing the FFT data for object detection. Object detection can be done by optionally employing a CFAR detection algorithm (see CFAR engine 220 in FIG. 2).

The radar system portion 100 is typically on a single semiconductor (e.g., silicon) chip shown as a substrate 105 in FIG. 1 that provides at least a semiconductor surface. One example for substrate 105 is a bulk silicon substrate having an epitaxial silicon surface. Other substrates 105 may be used.

The radar system portion 100 includes an analog block 110 that represents the respective analog front end components (antenna(s), power amplifier, mixers, band pass filters, low noise amplifiers (LNA's) and analog-to-digital converters (ADCs)) that are coupled to a digital front end 115 that generally includes a decimator which downsamples and filters the samples output by the ADC before they are presented to an ADC input buffer pair (ADC buffers 120) which function to store the pre-processed radar data for the HWA 125. Although shown on chip, the antenna(s) may be off chip.

The ADC buffers 120 and the output buffers 130 together provide the local memories for the HWA 125 (together shown as accelerator local memories 217 in FIG. 2 described below). The local memory 217 is a split memory that includes ADC buffers 120 for storing radar data samples received from a digital front end (e.g., digital front end 115 in FIG. 1) and output buffers 130 for receiving post processed radar data from a post-processing block 213. It is noted that although ADC buffers 120 and output buffers 130 are designated as input buffers and output buffers respectively, each of these 4 buffers has more generic applicability. For example, during periods when the digital front end is not streaming data to the ADC buffers 120 (such as during inter-frame periods), the HWA 125 is free to utilize any of the buffers as input/output buffers and in such periods the ADC buffers 120 operate as a generic buffers are not limited to storing samples output by the digital front end 115.

The split aspect of the local memory 217 allows each of these 4 blocks of memory shown in FIG. 2 to be accessed independently. However, a non-split local memory is also possible. A split memory for local memory 217 is useful when performing data processing in a ping/pong fashion, such as when data is being filled into a ping-input memory (from an external source), data from the pong input-buffer can be streamed into the FFT engine 210. Likewise, when data is being streamed out to the ping output-buffer, the previous data from the pong-buffer can be transported out to an external entity. The ping/pong-input memory and ping/pong-output memory can be assigned from the respective memory blocks of 217.

As shown in FIG. 2 µp 135' is coupled by a bus 145 to enable accessing the HWA internal memories (parameter-set configuration memory 235 and configuration registers 245 both shown in FIG. 2 described below), window RAM 212a within the windowed FFT block 212, as well as the local memory 217 shown in FIG. 2 comprising ADC buffers 120 and output buffers 130. An external memory block 140 comprises a memory external to the HWA 125 for transferring data in chunks (blocks) between the ADC buffers 120 as well the output buffers 130 and the external memory 140. The bus 145 connects to a high speed interface (HSI) 150 and a serial port 155. HSI 150 provides an interface between the radar system portion 100 and another signal processing unit (such as µP 135' shown in FIG. 2) that in an automotive application typically processes the processed radar data provided by the HWA frame-by-frame to determine the range, velocity and angle of any obstacle/vehicle in front of the vehicle's radar system.

An input formatter block 203 reads the input samples from the ADC buffers 120 and feeds them into the FFT engine 210 including the pre-processing block 211. The input formatter block 203 can be configured to perform a variety of tasks. For example, the input formatter block 203 can enable considerable flexibility in streaming data from the input memory (ADC buffers 120) into the HWA (using the 2D Memory indexing described below), can be configured to conjugate and/or scale the input data, can be configured to multiply the incoming data with a Binary Phase Modulation (BPM) pattern (which is a sequence of 1's and −1's), and can allow for circular indexing of the input memory which can be particularly useful if the HWA is being employed to do sub-band filtering using the FFT-IFFT approach.

The pre-processing block 211 is for providing at least one of interference mitigation (e.g., zeroing out of radar samples whose magnitude exceeds a programmable limit), finite impulse response (FIR) filtering and performing a complex multiply operation on the radar data sample stream received from the input formatter 203. The complex multiply operation can be configured to be in one of various modes. In the frequency shift mode, the complex multiplier frequency de-rotates the radar data sample stream by a certain programmable frequency. In a scalar multiplication mode the radar data sample stream is multiplied by a pre-programmed complex scalar using the complex multiplier block 211c shown. In the vector multiplication mode the complex multiplier block 211c performs an element wise multiplication of the radar data sample stream and a complex vector that has been stored in the internal look-up table (LUT) 211a shown as a sin, cos LUT that is coupled to the complex multiplier block 211c. The pre-processing block 211 is also shown including an interference mitigation block 211d between the output of the input formatter 203 and the complex multiplier block 211c. The interference mitigation block 211d can use threshold comparison for zeroing out/ clamping samples determined to be interference samples.

Pre-processing block 211 enables operations such as frequency shifting and FFT stitching. Regarding FFT stitching, the FFT Engine can perform streaming FFT's of generally up to 1024 points. This capability suffices for most radar applications while still keeping the area of the HWA small. To perform FFT's which are larger than 1024-points, the HWA offers an "FFT Stitching capability" where multiple smaller size FFT's computed on multiple sub-sets of a given input stream can be used to compute a larger size FFT of the entire input stream. As an example, when a 4K size FFT is needed, it is achieved in two steps. In the first step, every 4th input sample is passed through a 1K size FFT—i.e., four 1K point FFTs are performed on decimated input samples. Then, the resulting 4×1024 FFT outputs are sent through 4-point "stitching" FFTs (1024 4-point FFTs), which additionally involves a pre-multiplication by the complex multiplier block. The pre-processing block 211 also includes a FIR filter 211b for FIR filtering.

The windowed FFT block 212 is for multiplying the pre-processed samples by a window vector from window-coefficients stored in the window RAM 212a and then processing by a FFT block 212b for performing a FFT to generate Fourier transformed samples. The post-processing block 213 is for computing a magnitude of the Fourier transformed samples and performing a data compression operation (e.g., log 2 operation) for generating post-processed radar data. Data compression is optional and is configurable.

An output of the post-processing block 213 is coupled by an output formatter block 216 to an input of the output buffers 130 for transferring the post-processed radar data to the output buffers 130. The output formatter block 216 is responsible for writing the streaming processed output samples from post-processing block 213 into the output buffers 130.

The output formatter block 216 can also be configured to perform a variety of tasks. For example, the output formatter block 216 can enable considerable flexibility in streaming data from the HWA into the output memory (using the 2D-Memory indexing explained below), can be configured to conjugate and/or scale the data prior to storing in the output buffers 130 and 'destination skip Sample' feature which allows for certain number of output samples (from the HWA) to be skipped (i.e. discarded) in the beginning. This feature (in conjunction with the parameter DST_ACNT (to be explained below), allows only a specific contiguous sub-set of the output samples from the HWA to be stored in output memory. This can be useful, such as when only a specific sub-set of FFT-bins are needed.

The HWA 125' is shown including an optional CFAR engine 220 positioned in a CFAR detection path parallel to the streaming series data path. CFAR engine 220 includes a pre-processing block 221 and CFAR detector 222 for detecting radar target returns against background noise (e.g., clutter and interference). It is noted that since the FFT engine 210 and the CFAR engine 220 will generally not be operating simultaneously, and in order to reduce the area of the HWA, there can be sharing of memory and logic between these two engines. FIG. 2 shows a shared memory 255 that is shared between the FFT block 210 and the CFAR Engine 220. Additionally, there can be sharing of logic between the post-processing block 213 and the pre-processing block 221.

A parameter-set configuration memory 235 (e.g., implemented as RAM) is also shown coupled to a state machine 240 both coupled by a bus 145 to the FFT engine 210. As known in the art a state machine is any device that stores the status of something at a given time and can operate on input to change the status and/or cause an action or output to take place for any given change. The state machine 240 is responsible for controlling the operation of the HWA 125' including for sequencing parameter-sets for execution of a chained sequence of computations and data transfers between the accelerator local memory 217 and an external memory 140, for controlling the pre-processing block 211, windowed FFT block 212 and post-processing block 213. The state machine 240 can be configured to run through a sequence of parameter-sets starting and ending at specified indices (such as a start index and an end index). The state machine 240 can also be configured to loop through this sequence a specific number of times.

The parameter-set configuration memory 235 is used to pre-configure the sets of parameters for a chained sequence of HWA operations. This memory can comprise an accelerator register configuration for the 16 different operations (each such configuration being referred to as a parameter-set). This allows the HWA to perform pre-configured chained sequence of operations without frequent intervention from the µP 135'. Each parameter-set includes various configuration details for each component inside the accelerator engine. For example, these configuration parameters can include the number of radar samples to read, starting memory address for sample read operation, memory base address, enable/disable for Core Computational engine operations (FFT, Magnitude, Phase, etc.), number of samples to write, starting memory address for sample write operation, etc. This feature enables meaningful chaining or sequencing of various radar signal processing operations with minimal intervention from the µP 135' or other processor and as a result of that, makes efficient use of the capabilities of the FFT engine 210, triggering and DMA chaining options. The configuration registers 245 store common configuration information that is applicable to all parameter-sets.

The parameter-set also allows for autonomous interfacing of the HWA with DMA's for data transfer. Each parameter-set can be configured to require the HWA to trigger a DMA once it has completed the computations corresponding to the parameter-set. This allows the HWA to initiate a transfer of data out of its output buffers 130, or to initiate transfer of a new set of input data into its input buffer provided by ADC buffers 120. The execution of each parameter-set can also be made conditional on a trigger. This means that the state machine delays the execution of a scheduled parameter-set, until the configured trigger condition is true. Examples of triggers include (1) An interrupt announcing the availability of data in the ADC buffer, (2) completion of a specific DMA transfer (3) software trigger from the main processor such as µp 135'.

The overall operation of the radar sub-system 200 can be summarized as follows. The FFT engine 210 is configured by the µP 135' through the parameter configuration registers (or RAM) 245. Then, the state machine 240 kicks off and controls the overall operation of the HWA 125', which involves loading the parameters needed for current operation from the parameter-set configuration memory 235 into internal registers of the FFT engine 210 (or CFAR engine 220) and running the FFT engine 210 (or CFAR Engine 220) as per the programmed configuration. In one design, the FFT engine 210 and the associated memory (120, 130, 235, and 245) run on a 200 MHz clock.

Disclosed HWAs solve the above-described problems with known HWAs by having the FFT engine 210 including Pre-processing, windowed FFT 212 and post-processing blocks 213 in one streaming data path, along with a parameter-set configuration memory 235 and state machine 240, such that a flexible sequence of operations (e.g., multi-dimensional FFT pre-processing, windowing FFT, and post processing 213, is performed back-to-back without frequent intervention by the main processor 135 (µP 135' in FIG. 2).

Disclosed embodiments include a method of FMCW radar signal processing using a disclosed HWA. The method can comprise:

1. Streaming pre-processed radar data from an input buffer (e.g., ADC buffers 120) to an HWA 125 comprising a FFT engine 210 coupled to the ADC buffers for receiving and processing pre-processed radar data, where the HWA includes a FFT engine 210 that performs calculating including interference-thresholding, windowing FFT and range FFT to generate post-processed radar data including range FFT data.

2. Streaming the post-processed radar data to an output buffer 130.

3. Transferring the range FFT data from the output buffer 130 to an external memory (140) in a transpose fashion. The transferring can comprise direct memory access (DMA), with the DMA being triggered automatically by the HWA 125.

4. Repeating the calculating, streaming pre-processed and post-processed radar data, and transferring the pre-processed streaming radar data received at multiple antennas (or more generically multiple channels). The range FFT data for multiple antennas across multiple chirps in a frame are computed and transferred as in 1-3 above.

The range FFT data originating from the multiple antennas across multiple chirps is then processed in further processing steps, comprising:

5. Transferring from the external memory 140 in blocks to an input memory (ADC buffers 120), with each block including data for one or more range gates across multiple chirps in a frame.

6. Performing multiple Doppler FFT's using the HWA, each Doppler FFT corresponding to a specific antenna of each of the one or more range gates corresponding to a block. Additionally, the absolute values of the Doppler FFT bins are computed and these are summed across multiple antennas. The summing of the absolute value across multiple antennas can be performed by running an appropriate length FFT (for e.g. a 4 point FFT for 4 antennas) in the HWA and then picking the first sample of the FFT output.

7. The Doppler FFTs computed in Step 6 and the sum of the absolute values of the Doppler FFT bins across antennas are both stored in external memory 140 via direct memory accesses (DMA), the DMA being triggered automatically by the HWA.

8. Repeating steps 5, 6, 7 across multiple blocks to cover all range gates corresponding to the range-FFT.

The method can also further comprising detecting radar target returns against a background using a CFAR engine 220 in a CFAR detection path parallel to the streaming series data path including a pre-processing block 221 and a CFAR detector 222. Samples corresponding to range-FFT or Doppler FFT can be streamed through the CFAR detector 222 to detect peaks which are above a programmed specified threshold compared to the surrounding samples.

The CFAR engine 220, can also be employed for interference detection using a method described herein. The digitized time domain samples from the Digital front end (corresponding to a single chirp on a single channel) that are stored in the ADC buffers 120 are streamed into the CFAR Engine 220 of the HWA. The pre-processing block 221 of the CFAR Engine 220 can be used to compute the magnitude (or log magnitude) of the streamed samples. The output of the pre-processing block 221 is then streamed to the CFAR detector 222 which then detects samples whose magnitude is significantly above the average magnitude of the surrounding blocks (these samples are considered to be corrupted by interference). The indices of the detected samples are stored in the output buffer. Subsequently, the µp can read the list of indices of the detected samples and run any suitable algorithm (such as 1-dimensional interpolation) for correcting the values of these samples.

A variant of the method described above is as follows. In this method the processing starts only when samples from the Digital front end corresponding to multiple chirps have been stored in the ADC buffers 120. The samples in the ADC buffers 120 can be viewed as being stored as a matrix, with each row corresponding to samples from the specific chirp. In the first step the samples from the ADC buffers 120 are sent row-wise into the CFAR engine to obtain a first series of lists, each list containing the indices of detected samples corresponding to each row.

In the second step, the samples from the ADC buffer 120 are sent column wise (using 2D-Memory indexing) into the CFAR engine to obtain a second series of lists, each list containing the indices of detected samples corresponding to each column. In the third step the first series of lists and the second series of lists (that are stored in the output buffers 130 of the HWA) are examined by the µp (or other processor) to obtain a final list of samples from the ADC buffers 120 that are present in both the first list and the second list. This final list of samples is identified as being corrupted by interference. Th µp can then employ any suitable algorithm to correct these corrupted samples (such as 2-Dimensional interpolation).

Multiple dimensional computations, versatile access patterns from the input buffer into the HWA and to the output buffer from the HWA are enabled by a new disclosed 2D-Memory indexing scheme for memory access. Indexed memory addressing allows the significant flexibility in (a) the way in which data stored in the ADC buffers 120 is streamed into the HWA 125, and (b) the way in which data that is streamed out of the HWA 125 is stored in the output buffers 130. While each parameter-set defines a specific configuration (or operation) of the HWA (and input formatter/output formatter), this specific configuration can operate on multiple radar data sample streams (or simply sample streams), the number of such sample streams, the number of input samples for each sample stream and input/output access pattern for each sample stream can also be programmed in the same parameter-set. Thus for e.g., a single parameter-set can be configured to perform a 256-pt FFT on multiple sample streams (each sample stream, for e.g., corresponding to data from a different antenna).

In the 2D-Memory indexing scheme, the streaming of data from the input memory (ADC buffers 120) to the HWA can be defined by the parameters: SRC_ADDR, SRC_ACNT, SRC_AIDX, BCNT, SRC_BIDX, and SRC_ACNT. For streaming into the HWA 125 from ADC buffers 120 as input memory, a sample stream comprising SRC_ACNT samples (starting from SRC_ADDR) is streamed, each sample being SRC_AIDX bytes (which specifies the address offset (in bytes) separating successive samples) separated in the ADC buffers 120 as input memory from the previous. BCNT which specifies the number of iterations, such sample streams of SRC_ACNT samples each are streamed in, the first sample of each sample stream being separated by SRC_BINDX bytes from the preceding sample stream. Analogously, the streaming of data from the HWA to the output memory is defined by the parameters DST_ADDR, DST_ACNT, DST_AIDX, BCNT, DST_BIDX. It is noted that the 2D-Memory indexing scheme allows for different access patterns at the input and output. Thus, one has SRC_ADDR/DST_ADDR, SRC_AIDX/DST_AIDX etc. Only the number of iterations (BCNT) is generally consistent across both input and output streams.

In some embodiments the HWA might not include an FIR filter in the FFT block 210. In such embodiments filtering operations can be efficiently performed in the HWA as follows. In the first step the incoming samples are streamed into the HWA to perform an FFT (using a first parameter-set). In the second step, the samples corresponding to the FFT are streamed into the HWA (using a second parameter-set) with the pre-processing block 211 and the FFT engine 210 both enabled. The complex multiplier is used to multiply the samples of the FFT with a complex vector that represents the frequency response of the desired filter and the FFT engine 222 performs an I-FFT (inverse FFT) on the output of the pre-processing block. Thus the entire filtering operation is performed efficiently with just two streamings of the data through the HWA.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A radar hardware accelerator (HWA), comprising:
   a fast Fourier transform (FFT) engine including:
   a pre-processing block for providing at least one of interference mitigation, finite impulse response (FIR) filtering and multiplying a radar data sample stream received from ADC buffers within a split accelerator local memory that also includes output buffers by a pre-programmed complex scalar or a specified sample from an internal look-up table (LUT) to generate pre-processed samples;
   a windowing plus FFT block (windowed FFT block) for multiplying said pre-processed samples by a window vector and then processing by an FFT block for performing a FFT to generate Fourier transformed samples;
   a post-processing block for computing a magnitude of said Fourier transformed samples; and
   wherein said pre-processing block, said windowed FFT block, and said post-processing block are connected in one streaming series data path.

2. The HWA of claim 1, further comprising a constant false alarm rate (CFAR) engine in a CFAR detection path parallel to said streaming series data path including a log-magnitude pre-processing block and a CFAR detector for detecting radar target returns against a background.

3. The HWA of claim 2, wherein said CFAR detection path shares at least one of a shared memory and logic with said FFT engine.

4. The HWA of claim 1, wherein said pre-processing block, said windowed FFT block and said post-processing block include independent enable (EN) circuits to provide independent muxing controls that enable/bypass for any combination of said pre-processing block, said windowed FFT block and said post-processing block.

5. The HWA of claim 1, further comprising a substrate that provides at least a semiconductor surface, wherein said HWA is formed in said semiconductor surface.

6. The HWA of claim 1, wherein said ADC buffers and said output buffers are both split memories.

7. A radar sub-system, comprising:
   a split accelerator local memory including ADC input buffers (ADC buffers) for storing radar data sample streams, and output buffers;
   a radar hardware accelerator (HWA) coupled to said ADC buffers for receiving said radar data sample streams and for processing said radar data sample streams, said HWA including:
   a fast Fourier transform (FFT) engine including:
   a pre-processing block for providing at least one of interference mitigation, finite impulse response (FIR) filtering and multiplying said radar data sample streams by a pre-programmed complex scalar or a specified sample from an internal look-up table (LUT) to generate pre-processed samples;
   a windowing plus FFT block (windowed FFT block) for multiplying said pre-processed samples by a window vector and then processing by an FFT block for performing a FFT to generate Fourier transformed samples;
   a post-processing block for computing a magnitude of said Fourier transformed samples for generating post-processed radar data, wherein said pre-processing block, said windowed FFT block, and said post-processing block are connected in one streaming series data path, and wherein an output of said post-processing block is coupled to an input of said output buffers for transferring said post-processed radar data to said output buffers, and a parameter-set configuration memory coupled to a state machine both coupled by a bus to said FFT engine for sequencing parameters sets for execution of a chained sequence of operations and data transfers between said accelerator local memory and an external memory for controlling said pre-processing block, said windowed FFT block and said post-processing block.

8. The radar sub-system of claim 7, wherein said state machine is a parameter-set based state machine wherein said parameter-sets are programmable, said parameter-sets for configuring said HWA to perform a certain set of said operations, and wherein a sequence of executing said parameter-sets is defined.

9. The radar sub-system of claim 7, further comprising a constant false alarm rate (CFAR) engine in a CFAR detection path parallel to said streaming series data path including a log-magnitude pre-processing block and CFAR detector for detecting radar target returns against a background.

10. The radar sub-system of claim 7, wherein said ADC buffers and said output buffers are both split memories.

11. The radar sub-system of claim 7, further comprising a substrate that provides at least a semiconductor surface, wherein said HWA is formed in said semiconductor surface.

12. The radar sub-system of claim 7, wherein said pre-processing block, said windowed FFT block and said post-processing block include independent enable (EN) circuits to provide independent muxing controls that enable/bypass for any combination of said pre-processing block, said windowed FFT block and said post-processing block.

13. A radar sub-system, comprising:

a split accelerator local memory including ADC input buffers (ADC buffers) for storing radar data sample streams, and output buffers, a radar hardware accelerator (HWA) coupled to said ADC buffers for receiving said radar data sample streams and for processing said radar data sample streams, said HWA including:

a fast Fourier transform (FFT) engine including:

a pre-processing block for providing at least one of interference mitigation, finite impulse response (FIR) filtering and multiplying said radar data sample streams by a pre-programmed complex scalar or a specified sample from an internal look-up table (LUT) to generate pre-processed samples;

a windowing plus FFT block (windowed FFT block) for multiplying said pre-processed samples by a window vector and then processing by an FFT block for performing a FFT to generate Fourier transformed samples, and a post-processing block for computing a magnitude of said Fourier transformed samples for generating post-processed radar data, wherein said pre-processing block, said windowed FFT block, and said post-processing block are connected in one streaming series data path, and wherein an output of said post-processing block is coupled to an input of said output buffers for transferring said post-processed radar data to said output buffers;

a parameter-set configuration memory coupled to a state machine both coupled by a bus to said FFT engine for sequencing parameters sets for execution of a chained sequence of operations and data transfers between said accelerator local memory and an external memory for controlling said pre-processing block, said windowed FFT block and said post-processing block, wherein said state machine is a parameter-set based state machine wherein said parameter-sets are programmable, said parameter-sets for configuring said HWA to perform a certain set of said operations, and wherein a sequence of executing said parameter-sets is defined; and wherein said radar sub-system is configured to utilize 2D-memory indexing, wherein each of said parameter-sets performs a specific one of said operations on multiple ones of said radar data sample streams including a first radar data sample stream and a subsequent second radar data sample stream, and wherein a separation between subsequent samples of each of said radar data sample streams, a separation between an initial sample of said first radar data sample stream and an initial sample of said second radar data sample stream, and a number of said radar data sample streams for each of said operations is configurable via said parameter-sets.

14. A method of (FMCW) radar signal processing using a radar hardware accelerator (HWA), comprising:

coupling radar data sample streams from ADC input buffers (ADC buffers) to said HWA comprising a fast Fourier transform (FFT) engine for receiving and processing said radar data sample streams including calculating including at least one of interference-thresholding, windowing and range FFT to generate post-processed radar data including range FFT data;

streaming said post-processed radar data to output buffers;

transferring said range FFT data from said output buffers to an external memory via direct memory accesses (DMA), said DMA being triggered automatically by said HWA;

repeating said coupling, said calculating, said streaming, and said transferring for said radar data sample streams received by multiple antennas and across multiple chirps;

wherein further processing is performed on said range FFT data originating from said multiple antennas and across said multiple chirps, comprising:

transferring from said external memory in blocks to said output buffers, each said block including data for a first range gate and at least a second range gate;

performing multiple doppler FFT's using said HWA corresponding to said first range gate, wherein said doppler FFT's are computed for each of said multiple antennas in said first range gate;

performing an absolute value operation on result of said doppler FFT's for each of said multiple antennas corresponding to said first range gate, and summing results of the said absolute value operation across said multiple antennas, and repeating said further processing on subsequent data blocks from said data blocks corresponding to at least said second range gate.

15. The method of claim 14, wherein said transferring said range FFT data is performed in a transpose fashion.

16. The method of claim 14, further comprising detecting radar target returns against a background using a constant false alarm rate (CFAR) engine in a CFAR detection path parallel to a streaming series data path including a log-magnitude pre-processing block and a CFAR detector.

17. The method of claim 14, further comprising indexed memory addressing for data transfers to and from said HWA.

18. The method of claim 14, wherein said FFT engine comprises:

a pre-processing block for providing at least one of interference mitigation and multiplying said radar data sample streams within a split accelerator local memory including said output buffers by a pre-programmed complex scalar or a specified sample from an internal look-up table (LUT) to generate pre-processed samples;

a windowing plus FFT block (windowed FFT block) for multiplying said pre-processed samples by a window vector and then processing by an FFT block for performing a FFT to generate Fourier transformed samples, and a post-processing block for computing a magnitude of said Fourier transformed samples for generating said post-processed radar data;

wherein said pre-processing block, said windowed FFT block, and said post-processing block are connected in one streaming series data path.

19. The method of claim 18, wherein said pre-processing block, said windowed FFT block and said post-processing block include independent enable (EN) circuits to provide independent muxing controls that enable/bypass for any combination of said pre-processing block, said windowed FFT block and said post-processing block.

20. The method of claim 14, further comprising 2D-memory indexing, wherein each of multiple parameter-sets performs a specific operation on multiple ones of said radar data sample streams including a first radar data sample stream and a subsequent second radar data sample stream, and wherein a separation between subsequent samples of each of said radar data sample streams, a separation between an initial sample of said first radar data sample stream and an initial sample of said second radar data sample stream, and a number of said radar data sample streams for each of said operations is configurable via said parameter-sets.

* * * * *